United States Patent
Yang et al.

(10) Patent No.: US 8,370,877 B2
(45) Date of Patent: Feb. 5, 2013

(54) CONTENT DOWNLOADING METHOD AND APPARATUS USED BY MOBILE DEVICE

(75) Inventors: Do-jun Yang, Yongin-si (KR); Eun Namgung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 12/018,526

(22) Filed: Jan. 23, 2008

(65) Prior Publication Data

US 2008/0256580 A1  Oct. 16, 2008

(30) Foreign Application Priority Data

Apr. 10, 2007 (KR) .................. 10-2007-0035173

(51) Int. Cl.
 *H04N 7/173* (2011.01)
 *H04N 5/445* (2011.01)
 *G06F 17/30* (2006.01)
 *H04B 1/38* (2006.01)
(52) U.S. Cl. ............. 725/62; 725/81; 725/112; 455/425
(58) Field of Classification Search .................. 725/62, 725/81, 80, 112, 113; 455/425
 See application file for complete search history.

(56) References Cited

U.S. PATENT DOCUMENTS

| | | | |
|---|---|---|---|
| 2004/0024589 A1* | 2/2004 | Kondo et al. .................. 704/201 |
| 2004/0073901 A1* | 4/2004 | Imamatsu ..................... 717/170 |
| 2005/0047426 A1* | 3/2005 | Aaltonen et al. .............. 370/432 |
| 2005/0110909 A1 | 5/2005 | Staunton et al. |
| 2006/0172700 A1* | 8/2006 | Wu ............................. 455/41.2 |
| 2006/0205410 A1* | 9/2006 | Black ............................ 455/445 |
| 2006/0268895 A1* | 11/2006 | Kotzin ..................... 370/395.64 |
| 2007/0006289 A1* | 1/2007 | Limont et al. .................... 726/6 |
| 2007/0074248 A1 | 3/2007 | Kim |
| 2007/0130592 A1* | 6/2007 | Haeusel ........................... 725/81 |
| 2007/0283385 A1* | 12/2007 | Qiu et al. ........................ 725/34 |
| 2008/0098450 A1* | 4/2008 | Wu et al. ....................... 725/132 |
| 2008/0134256 A1* | 6/2008 | DaCosta ......................... 725/62 |
| 2008/0298388 A1* | 12/2008 | White ........................... 370/468 |

(Continued)

FOREIGN PATENT DOCUMENTS

EP  1557769 A1  7/2005
JP  2006-065808 A  3/2006

(Continued)

OTHER PUBLICATIONS

Communication and Search Report issued Oct. 1, 2010, in counterpart European Application No. 08712471.5.

(Continued)

*Primary Examiner* — Pankaj Kumar
*Assistant Examiner* — Reuben M Brown
(74) *Attorney, Agent, or Firm* — Sughrue Mion, PLLC (57) ABSTRACT

A content downloading method and apparatus of a mobile device employing an Internet protocol television (IPTV) are provided. The content downloading method and apparatus allow an IPTV to provide a mobile device with content information received from a service provider, allow a user to input content desired to be downloaded to the mobile device, and allow a user to download the content to the mobile device from the service provider via the IPTV, thereby quickly and easily downloading desired content to the mobile device without a complicated process of browsing and copying the content.

12 Claims, 7 Drawing Sheets

U.S. PATENT DOCUMENTS

2010/0095337 A1* 4/2010 Dua .............................. 725/110
2010/0146573 A1* 6/2010 Richardson et al. ........... 725/110
2010/0192184 A1* 7/2010 Margulis ......................... 725/81
2011/0131606 A1* 6/2011 Durden et al. .................. 725/40

FOREIGN PATENT DOCUMENTS

| KR | 10-2006-0041341 A | 5/2006 |
|---|---|---|
| KR | 10-2006-0084261 A | 7/2006 |
| WO | 2007/000455 A1 | 1/2007 |

OTHER PUBLICATIONS

Communication dated Nov. 10, 2011, issued by the European Patent Office in corresponding European Patent Application No. 08712471.5.

Communication dated Mar. 27, 2012 from the European Patent Office in counterpart European application No. 08712471.5.

* cited by examiner

CONTENT DOWNLOADING METHOD AND APPARATUS USED BY MOBILE DEVICE

CROSS-REFERENCE TO RELATED PATENT APPLICATION

This application claims priority from Korean Patent Application No. 10-2007-0035173, filed on Apr. 10, 2007 in the Korean Intellectual Property Office, the disclosure of which is incorporated herein by reference in its entirety.

BACKGROUND

1. Technical Field

Methods and apparatuses consistent with the present invention relate to content downloading, and more particularly, to content downloading by a mobile device using an Internet protocol television (IPTV).

2. Description of the Related Art

Despite the increase in the use of mobile devices such as MP3 players, personal multimedia players (PMPs), cellular phones or the like, users can only download desired media to mobile devices having a media playback function by using a complicated process of searching for the desired media over the Internet during their spare time at home, then downloading the desired media to PCs, and then copying the desired media to the mobile devices connected to the PCs. Such a complicated process has caused a huge inconvenience to users of mobile devices.

SUMMARY

The present invention provides a method and apparatus for quickly and easily downloading desired content to a mobile device.

The present invention also provides a recording medium storing a program for executing the method.

According to an aspect of the present invention, there is provided a content providing method comprising: transmitting content information received from a service provider providing a broadcast service over the Internet to a mobile device; if a content download request is received from the mobile device, requesting the service provider for the content; and receiving the content from the service provider and transmitting the content to the mobile device.

According to another aspect of the present invention, there is provided a computer-readable medium having embodied thereon a computer program for executing the content providing method.

According to another aspect of the present invention, there is provided a content providing apparatus of an IPTV comprising: a content information management unit transmitting content information received from a service provider providing a broadcast service over the Internet to a mobile device; a content request unit, if a content download request is received from the mobile device, requesting the service provider for the content; and a content transmission unit receiving the content from the service provider and transmitting the content to the mobile device.

According to another aspect of the present invention, there is provided a content downloading method used in a mobile device comprising: if the mobile device receives content information from an Internet protocol television (IPTV), displaying the content information; receiving at least one content list from among content lists included in the content information from the user; and requesting the IPTV to download contents included in the content list.

According to another aspect of the present invention, there is provided a computer-readable medium having embodied thereon a computer program for executing the content downloading method.

According to another aspect of the present invention, there is provided a content downloading apparatus used in a mobile device comprising: a display unit, wherein if the mobile device receives content information from an IPTV, then the display unit displays the content information; a key input unit receiving at least one content list from among content lists included in the content information from the user; and a download request unit requesting the IPTV to download contents included in the content list.

According to another aspect of the present invention, there is provided a content downloading method of a mobile device using an IPTV comprising: if content information received from a service provider is updated, the IPTV transmitting the content information to a mobile device; if the mobile device receives the content information from the IPTV, displaying the content information to a user; the mobile device receiving at least one content list from among content lists included in the content information from the user; the mobile device requesting the IPTV to download contents included in the content list; if the IPTV receives a request to download the contents, requesting the service provider to transmit the contents; and the IPTV receiving the contents from the service provider and transmitting the contents to the mobile device.

According to another aspect of the present invention, there is provided a content downloading system of a mobile device using an IPTV comprising: an IPTV, wherein if content information received from a service provider is updated, then the content information is transmitted to a mobile device, if the IPTV receives a content download request from the mobile device, a service provider is requested to transmit the content requested to be downloaded, the content from the service provider is received, and the content is transmitted to the mobile device; and the mobile device, if the mobile device receives updated content information from the IPTV, then displays the content information to a user, receives at least one content list from among content lists included in the content information from the user, and requests the IPTV to download contents included in the content list.

BRIEF DESCRIPTION OF THE DRAWINGS

The aspects of the present invention will become more apparent by describing in detail exemplary embodiments thereof with reference to the attached drawings, in which.

DETAILED DESCRIPTION OF EXEMPLARY EMBODIMENTS OF THE INVENTION

Hereinafter, exemplary embodiments of the present invention will be described more fully with reference to the accompanying drawings, in which exemplary embodiments of the invention are shown.

An IPTV is a system where a digital television service is delivered using the Internet Protocol (IP) over a network infrastructure. The IPTV enables a viewer to watch a desired broadcast program at a desired time, purchase goods, browse information, check e-mail and the like. The IPTV provides a bi-directional service, so that the viewer can input data into the IPTV or make a variety of requests to the IPTV, and thus the IPTV can process the viewer's requests instantly so as to respond to the requests. In particular, the IPTV provides an electronic program guide (EPG), which is an interactive type TV version of a broadcast television program timetable that appears in a newspaper. The EPG provides the viewer with the broadcast television program timetable and detailed information on programs and content. The EPG also allows the viewer to watch a scheduled television program by changing channels at the schedule time. Therefore, exemplary embodiments of the present invention provide a method and apparatus for easily downloading desired content to a mobile device using the IPTV that provides a TV broadcast program such as an EPG service, a content information service, a program pre-scheduling service, or the like.

Figure 1:
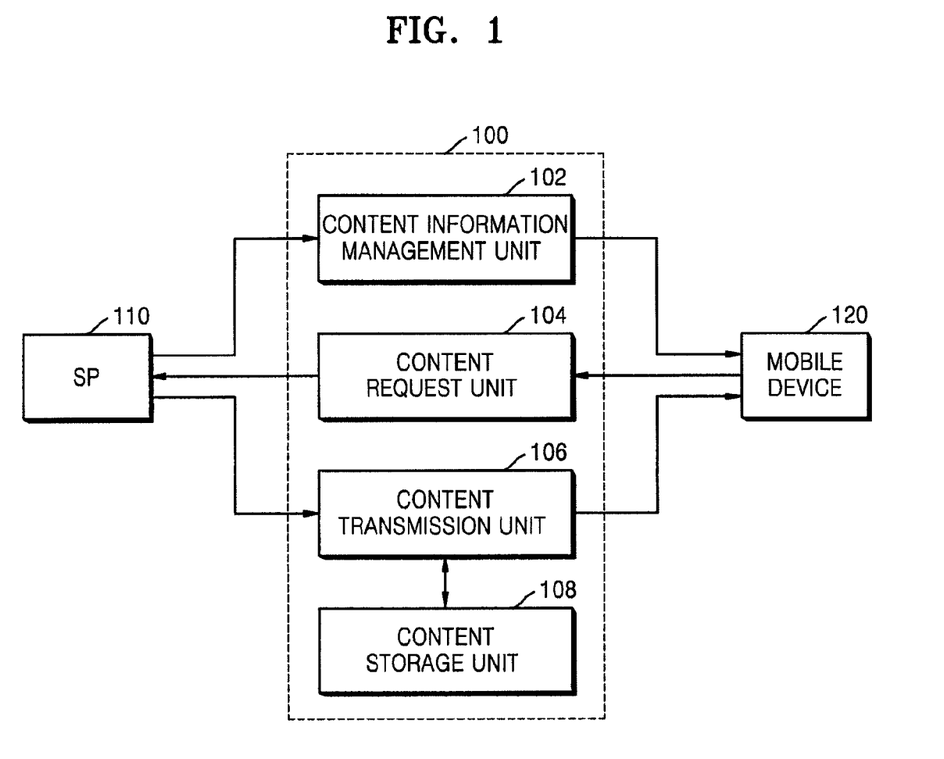
FIG. 1 is a block diagram of a content providing apparatus of an IPTV according to an exemplary embodiment of the present invention.

FIG. 1 is a block diagram of a content providing apparatus of an IPTV 100 according to an exemplary embodiment of the present invention. The content providing apparatus is included in the IPTV 100. Referring to FIG. 1, the content providing apparatus includes a content information management unit 102, a content request unit 104, a content transmission unit 106, and a content storage unit 108, and is connected to a service provider (SP) 110 and a mobile device 120.

The content information management unit 102 receives content information from the SP 110 providing a broadcast service over the Internet on a regular basis, and transmits the content information to the mobile device 120. In particular, the content information management unit 102 determines whether the content information received from the SP 110 has been updated, and, if the content information is determined to have been updated, then transmits the content information to the mobile device 120. In this regard, the content information management unit 102 receives the content information from the SP 110 on a regular basis, compares the content information with previously received content information, and determines whether both pieces of content information are identical to each other in order to determine whether the content information has been updated. The content information may include, but is not limited to, video on demand (VoD) content information, scheduled broadcast information, or the like. The VoD content information includes a list of content. The scheduled broadcast information includes, for instance, a timetable and list of scheduled broadcast programs.

If the content request unit 104 receives a content download request from the mobile device 120, then the content request unit 104 transmits a content download request command and a list of content whose downloading is requested to the SP 110 so as to request the content.

The content transmission unit 106 receives the content requested by the content request unit 104 from the SP 110 and transmits the content to the mobile device 120 or stores the content in the content storage unit 108. For example, a personal video recorder (PVR), in which a hard disc is embedded, may be used as the content storage unit 108.

Figure 2:
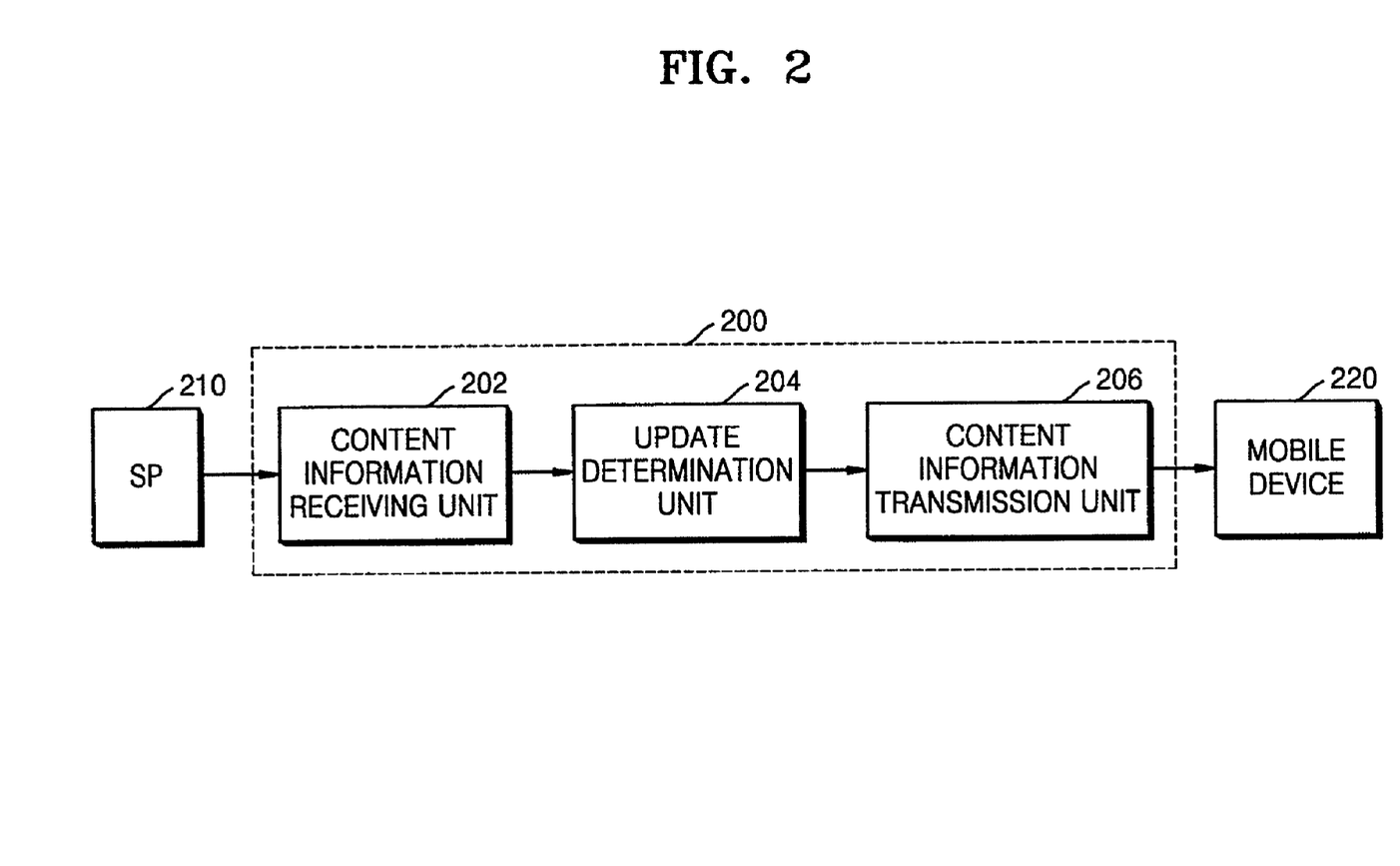
FIG. 2 is a block diagram of a content information management unit according to an exemplary embodiment of the present invention.

FIG. 2 is a block diagram of a content information management unit 200 according to an exemplary embodiment of the present invention. Referring to FIG. 2, the content information management unit 200 includes a content information receiving unit 202, an update determination unit 204, and a content information transmission unit 206.

The content information receiving unit 202 receives content information from an SP 210 on a regular basis, and transmits the content information to the update determination unit 204.

The update determination unit 204 compares the content information with a previously received content list and determines whether the content information is identical to content information included in the previously received content list in order to determine whether the content information provided by the SP 210 has been updated.

The content information transmission unit 206 transmits the content information received in the content information receiving unit 202 to the mobile device 220, if the update determination unit 204 determines that the content information provided by the SP 210 has been updated.

Figure 3:
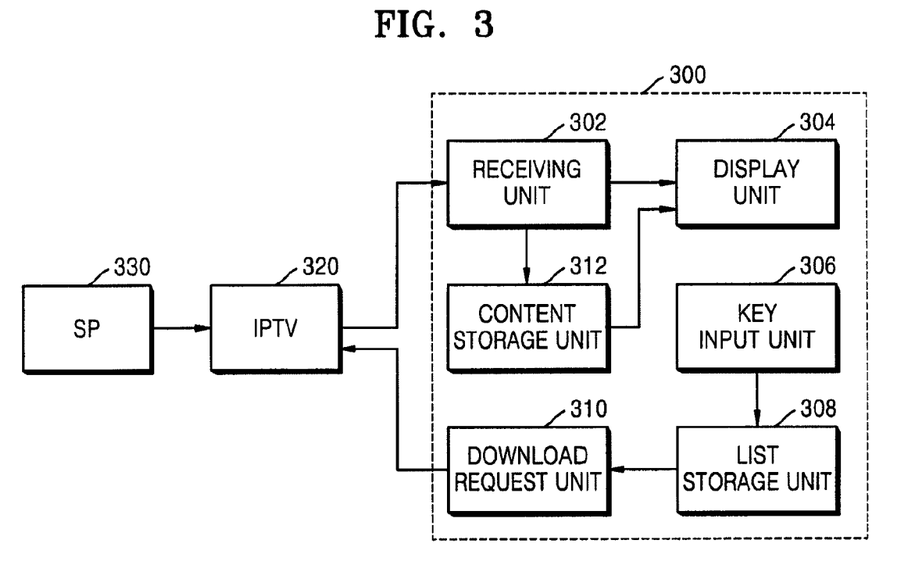
FIG. 3 is a block diagram of a content downloading apparatus used by a mobile device according to an exemplary embodiment of the present invention.

FIG. 3 is a block diagram of a content downloading apparatus used by a mobile device 300 according to an exemplary embodiment of the present invention. The content downloading apparatus is included in the mobile device 300. Referring to FIG. 3, the content downloading apparatus includes a receiving unit 302, a display unit 304, a key input unit 306, a list storage unit 308, a download request unit 310, and a content storage unit 312.

The receiving unit 302 receives content information from an IPTV 320 and provides the content information with the display unit 304. In addition, the receiving unit 302 downloads content from the IPTV 320 and provides the content to the content storage unit 312 or to the display unit 304. The content is requested by a user using the mobile device 300, provided by an SP 330, and received in the mobile device 300 via the IPTV 320. The content information may include, but is not limited to, VoD content information, scheduled broadcast information, or the like. The VoD content information includes at least a list of content. The scheduled broadcast information includes, for instance, a timetable and a list of scheduled broadcast programs.

The display unit 304 may display the content information received in the receiving unit 302 to a user. In addition, the display unit 304 displays the content downloaded by the receiving unit 302 or stored in the content storage unit 312 to the user.

The key input unit 306 receives from the user at least one content list from among content lists included in the content information displayed on the display unit 304, and provides the content list with the list storage unit 308.

The list storage unit 308 stores the content list provided by the key input unit 306.

The download request unit 310 requests the IPTV 320 to download content according to the content list stored in the list storage unit 306. The download request unit 310 provides the IPTV 320 with a download request command and the content list.

The content storage unit 312 stores the content downloaded by the receiving unit 302. The display unit 304 displays the content to the user.

Figure 4:
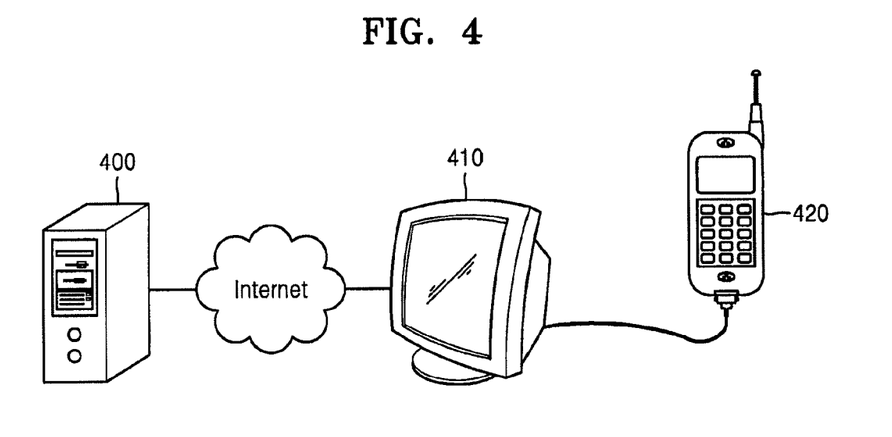
FIG. 4 illustrates a content downloading system used by a mobile device using an IPTV according to an exemplary embodiment of the present invention.

FIG. 4 illustrates a content downloading system used by a mobile device 420 using an IPTV 410 according to an exemplary embodiment of the present invention. Referring to FIG. 4, the content downloading system of the present exemplary embodiment includes an SP 400, the IPTV 410, and the mobile device 420. The IPTV 410 and the mobile device 420 can be connected to each other, for instance, via a given standard plug and play (PnP) interface such as a Universal Serial Bus (USB), Ethernet, or the like.

The IPTV 410 receives content information from the SP 400 on a regular basis, determines whether updated content information is included in the received content information, and if the received content information is determined to have the updated content information, then transmits the updated content information to the mobile device 420.

The mobile device 420 receives the content information from the IPTV 410 and displays the content information to a user. The mobile device 420 receives at least one content list among content lists included in the displayed content information from the user, and stores the content list. The mobile device 420 requests the IPTV 410 to download content included in the content list.

The IPTV 410 requests the SP 400 to download the content in response to the request from the mobile device 420. The IPTV 410 receives the content from the SP 400 and transmits the content to the mobile device 420. In this regard, the IPTV 410 can store the content received from the SP 400 and, if the IPTV 410 is connected to the mobile device 420, then transmits the content to the mobile device 420.

The mobile device 420 downloads the content through the IPTV 410 and displays the download content to the user.

Figure 5:
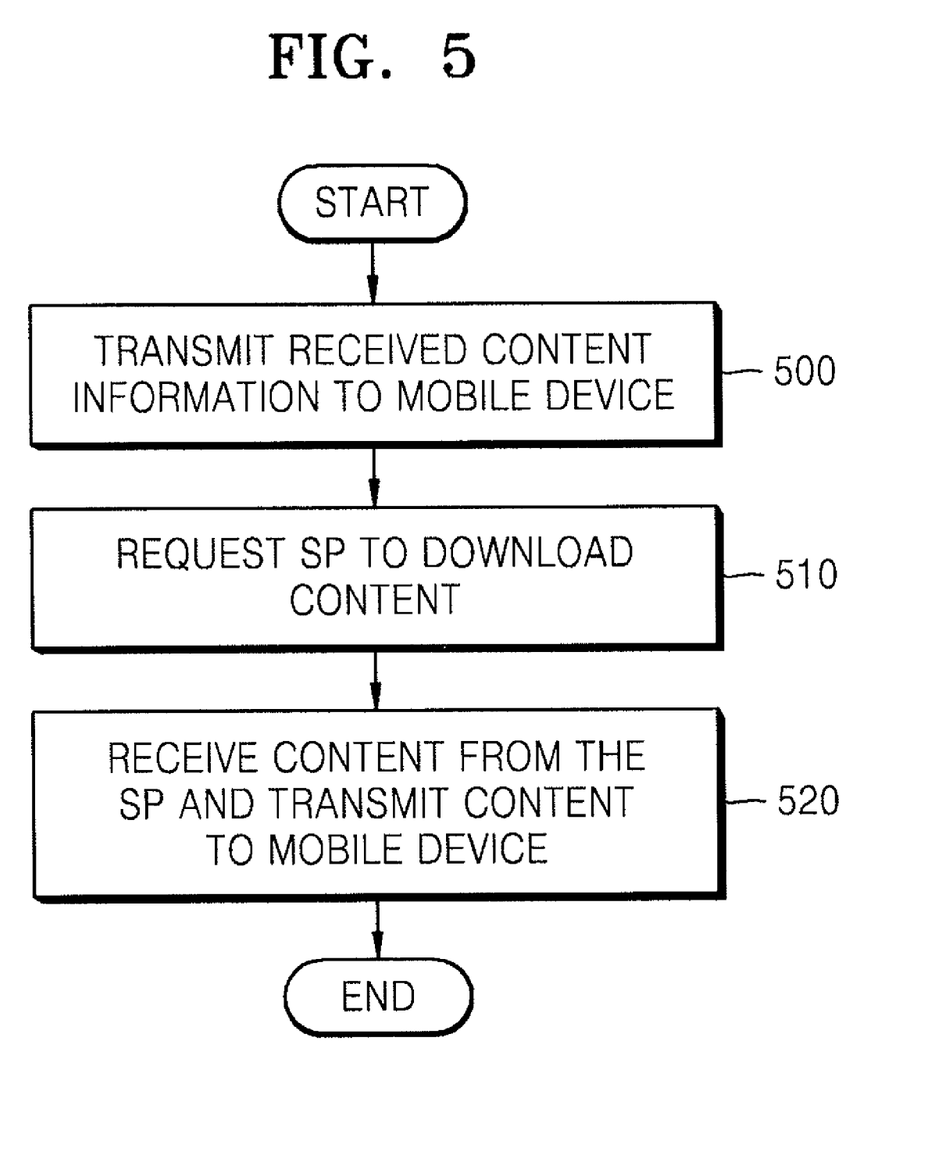
FIG. 5 is a flowchart illustrating a content providing method used in an IPTV according to an exemplary embodiment of the present invention.

FIG. 5 is a flowchart illustrating a content providing method used in an IPTV according to an exemplary embodiment of the present invention. Referring to FIG. 5, the content providing method used in the IPTV of the present exemplary embodiment comprises time-serially processed operations of the content providing apparatus of the IPTV 100 illustrated in FIG. 1. Therefore, the above description of the content providing apparatus of the IPTV 100 is applied to the content providing method used in the IPTV of the present exemplary embodiment.

The content providing apparatus receives content information from the SP 110 providing a broadcast service over the Internet on a regular basis, and transmits the content information to the mobile device 120 (Operation 500). In particular, the content providing apparatus determines whether the content information received from the SP 110 has been updated, and, if the content providing apparatus determines that the content information has been updated, then transmits the content information to the mobile device 120. In this regard, the content providing apparatus receives the content information from the SP 110 on a regular basis, compares the content information with previously received content information, and determines whether both pieces of content information are identical to each other in order to determine whether the content information has been updated. The content information may include, but is not limited to, VoD content information, scheduled broadcast information, or the like. The VoD content information includes a content list. The scheduled broadcast information includes, for instance, a timetable and a list of scheduled broadcast programs.

If the content providing apparatus receives a content download request from the mobile device 120, then the content providing apparatus transmits a content download request command and a list of content whose downloading is requested to the SP 110 so as to request the content (Operation 510).

If the content providing apparatus receives the content download request from the mobile device 120, then the content providing apparatus requests the SP 110 for the content at the time when the SP 110 provides the content, which is, in particular, when the content providing apparatus requests broadcast content to be broadcast to the SP 110.

The content providing apparatus receives the content from the SP 110 and transmits the content to the mobile device 120 (Operation 520). The content providing apparatus stores the content, and, if the content providing apparatus is connected to the mobile device 120, transmits the content to the mobile device 120. A PVR, in which a hard disc is embedded, for example, may be used to store the content.

Figure 6:
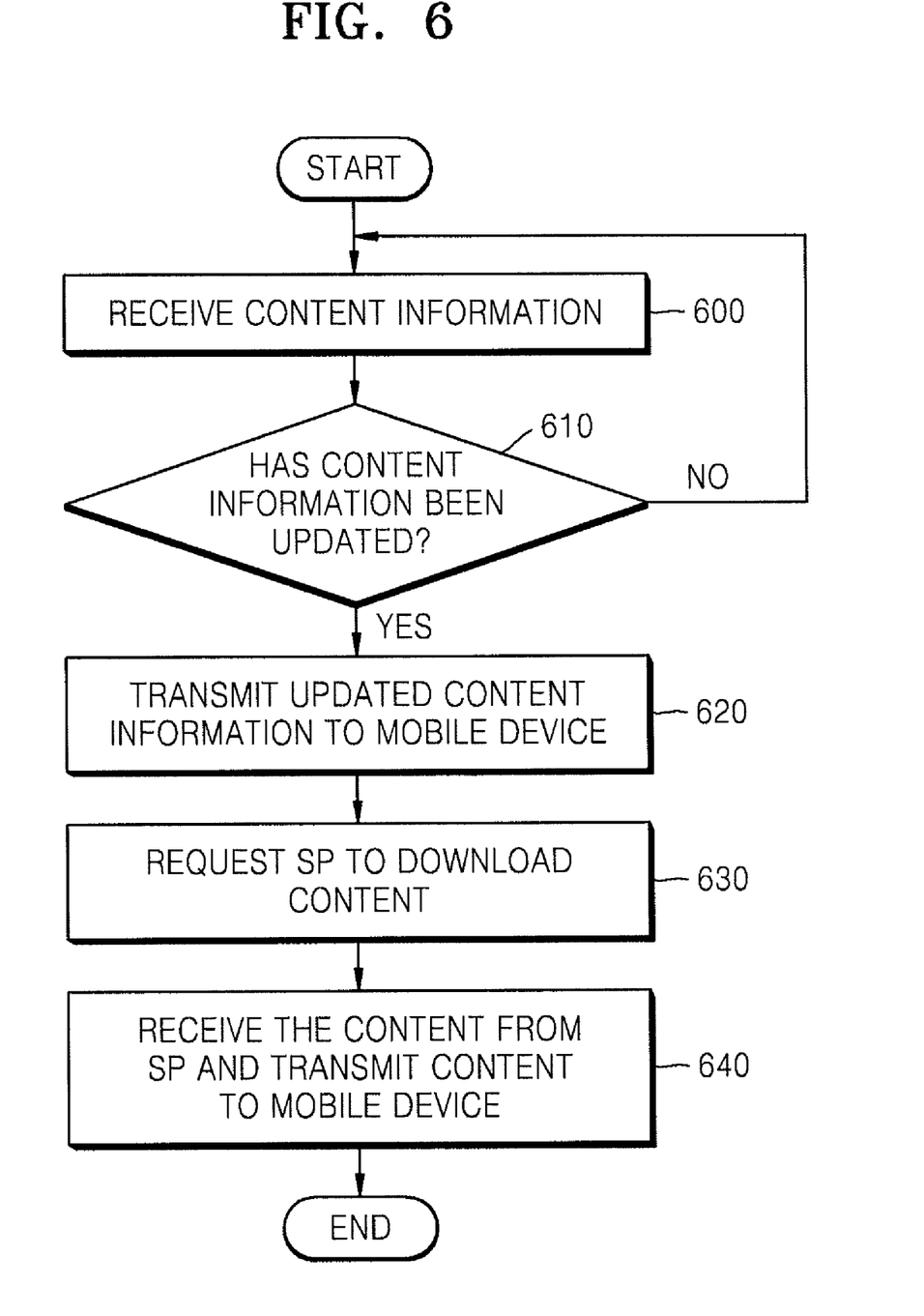
FIG. 6 is a flowchart illustrating a content providing method used in an IPTV according to another exemplary embodiment of the present invention.

FIG. 6 is a flowchart illustrating a content providing method used in an IPTV according to another exemplary embodiment of the present invention. Referring to FIG. 6, the content providing method used in the IPTV of the present exemplary embodiment comprises time-serially processed operations of the content providing apparatus of the IPTV 200 illustrated in FIG. 2.

The content providing apparatus receives content information from an SP 210 on a regular basis (Operation 600).

The content providing apparatus compares the content information with previously received content information and determines whether both pieces of content information are identical to each other in order to determine whether the content information has been updated (Operation 610).

The content providing apparatus then transmits the updated content information to the mobile device 220, if the content providing apparatus determines that the content information has been updated (Operation 620).

If the content providing apparatus receives a content download request from the mobile device 220, then the content providing apparatus transmits a content download request command and content list to the SP 210 to request content (Operation 630). For example, the content is requested by a user using the mobile device 220.

The content providing apparatus receives the content from the SP 210 and transmits the content to the mobile device 220 (Operation 640).

Figure 7:
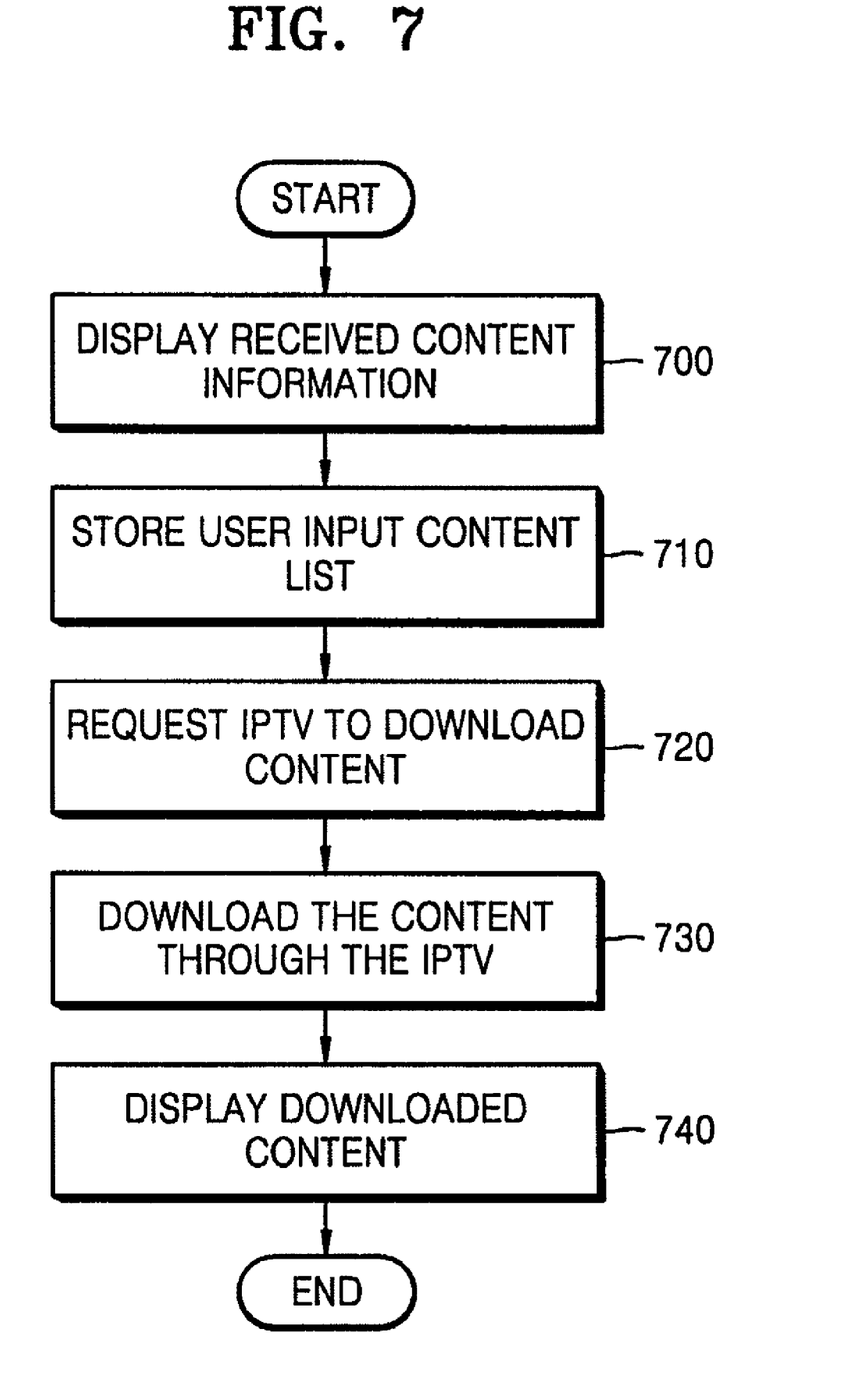
FIG. 7 is a flowchart illustrating a content downloading method used in a mobile device according to an exemplary embodiment of the present invention.

FIG. 7 is a flowchart illustrating a content downloading method used in a mobile device according to an exemplary embodiment of the present invention. Referring to FIG. 7, the content downloading method used in the mobile device of the present exemplary embodiment comprises time-serially processed operations of the content downloading apparatus of the mobile device 300 illustrated in FIG. 3. Referring to FIG. 7, the content downloading apparatus receives updated content information from the IPTV 320 and displays the content information to a user (Operation 700).

The content downloading apparatus receives, from the user, at least one content list from among content lists included in the content information, and stores the content list (Operation 710).

If the content downloading apparatus is connected to the IPTV 320, then the content downloading apparatus requests the IPTV 320 to download content included in the content list (Operation 720). In this case, the content downloading apparatus provides the IPTV 320 with the content list.

The content downloading apparatus downloads the content from the SP 330 through the IPTV 320 (Operation 730).

The content downloading apparatus then displays the content to the user (Operation 740).

Figure 8:
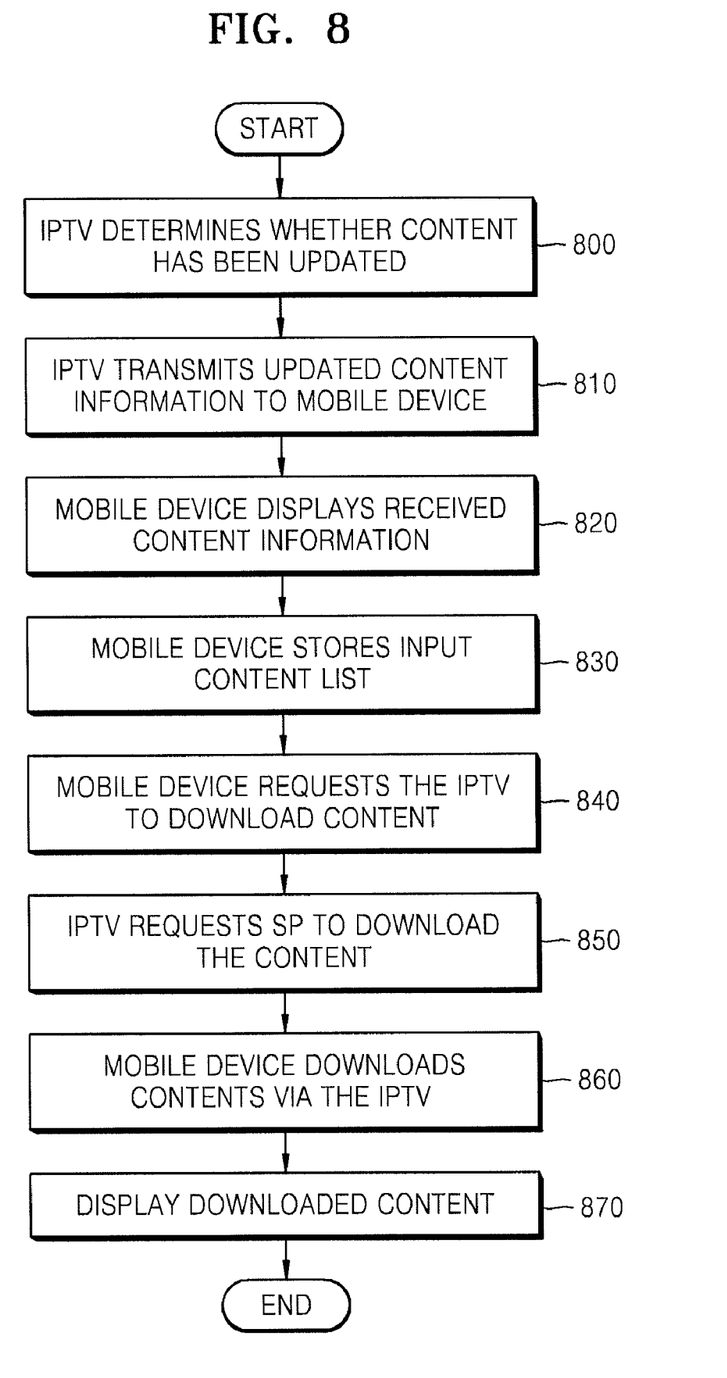
FIG. 8 is a flowchart illustrating a content downloading method using an IPTV employed in a mobile device according to an exemplary embodiment of the present invention.

FIG. 8 is a flowchart illustrating a content downloading method employing an IPTV used in a mobile device according to an exemplary embodiment of the present invention. Referring to FIG. 8, the content downloading method using the IPTV used in the mobile device of the present exemplary embodiment comprises time-serially processed operations of the content downloading apparatus of the mobile device 420 using the IPTV 410 illustrated in FIG. 4. Referring to FIG. 8, the IPTV 410 receives content information from the SP 400 on a regular basis, and determines whether updated content information is included in the content information (Operation 800).

When the IPTV 410 is connected to the mobile device 420, the IPTV 410 detects the connection, and if the content information is determined to have been updated, then transmits the updated content information to the mobile device 420 (Operation 810). The mobile device 420 can be connected to the IPTV 410 via a given standard PnP interface, for example, such as a USB, Ethernet, or the like.

The mobile device 420 receives the content information from the IPTV 410 and displays the content information to a user (Operation 820).

The mobile device 420 receives at least one content list among content lists included in the displayed content information from the user, and stores the content list (Operation 830).

When the mobile device 420 is connected to the IPTV 410, the mobile device 420 requests the IPTV 410 to download content included in the content list (Operation 840).

The IPTV 410 requests the SP 400 to download the content in response to the request from the mobile device 420 (Operation 850).

The IPTV 410 receives the content from the SP 400 and downloads the content to the mobile device 420 (Operation 860). In this regard, the IPTV 410 can store the content received from the SP 400 and, if the IPTV 410 is connected to the mobile device 420, then transmit the content to the mobile device 420. A PVR, in which a hard disc is embedded, may be used to store the content, for example.

The mobile device 420 displays the downloaded content to the user (Operation 870).

The present invention can also be embodied as computer readable code on a computer readable recording medium. A computer readable recording medium is any data storage device that can store data that can be thereafter read by a computer system. Examples of such a computer readable recording medium may include, but are not limited to, read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, the content downloading method and apparatus using an IPTV, according to the exemplary embodiments of the present invention, allow an IPTV to provide a mobile device with content information received from an SP, allow a user to input content desired to be downloaded to the mobile device, and allows a user to download the content to the mobile device from the SP via the IPTV, thereby quickly and easily downloading desired content to the mobile device without a complicated process of browsing and copying the content during a spare time.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A content providing method comprising:
   receiving, by an Internet Protocol television display device, content information from a service provider which provides a broadcast service using an Internet Protocol;
   transmitting the received content information, from the Internet Protocol television display device, to a mobile device; and
   if a content download request is received, by the Internet Protocol television display device, from the mobile device, the content download request being a request to download content identified by the received content information, the content including at least one of a broadcast video program and video on demand (VOD) contents, then in response to the content download request:
   requesting, by the Internet Protocol television display device, the service provider for the content;
   receiving, by the Internet Protocol television display device, the content from the service provider;
   storing the received content; and
   transmitting, by the Internet Protocol television display device, the stored content to the mobile device based on a schedule, the stored content including the at least one of the broadcast video program and VOD contents,
   wherein the schedule is pre-determined by a user input.

2. The content providing method of claim 1, wherein the transmitting of the received content information comprises:
   comparing the received content information with previously stored content information to determine whether the received content information has been updated; and
   if it is determined that the received content information has been updated, transmitting the received content information to the mobile device.

3. The content providing method of claim 1, wherein the requesting the service provider for the content comprises:
   if the content download request is received from the mobile device, standing by until the service provider provides the content.

4. A non-transitory computer-readable medium storing a computer program for executing the method of claim 1.

5. A content downloading method used in a mobile device, the method comprising:
   receiving, by the mobile device, content information from an Internet protocol television (IPTV);
   displaying, by the mobile device, the received content information;
   receiving, by the mobile device, at least one content list, from among content lists included in the content information;
   requesting, by the mobile device, the IPTV to download and store content included in the received content list from a service provider, the requested content including at least one of a broadcast video program and video on demand (VOD) contents; and
   in response to the request to the IPTV to download content, receiving, by the mobile device, the downloaded and stored content from the IPTV based on a schedule, the stored content including the at least one of the broadcast video program and VOD contents, wherein the schedule is pre-determined by a user input.

6. The content downloading method of claim 5, further comprising:

storing the content list; and requesting the IPTV to download content included in the content list to the mobile device.

7. A content providing apparatus of an Internet protocol television (IPTV), the apparatus comprising:

a content information management unit of the IPTV which transmits content information, that is received, by the content information management unit, from a service provider providing a broadcast service using an Internet protocol, to a mobile device;

a content request unit of the IPTV which, if a content download request is received, by the content request unit, from the mobile device, the content download request being a request to download content identified by the received content information, the content including at least one of a broadcast video program and video on demand (VOD) contents, then in response to the content download request, requests the service provider for the content; and a content transmission unit of the IPTV which receives the content from the service provider, stores the received content, and transmits the stored content to the mobile device based on a schedule, the stored content including the at least one of the broadcast video program and VOD contents, wherein the schedule is pre-determined by a user input.

8. The content providing apparatus of claim 7, wherein the content information management unit comprises:

an update determination unit which compares the received content information with previously stored content information to determine whether the received content information has been updated; and wherein the content information management unit transmits the received content information to the mobile device according to a result of the determination of the update determination unit.

9. A content downloading apparatus in a mobile device, the apparatus comprising:

a display unit of the mobile device which, if the mobile device receives content information from an Internet protocol television (IPTV), displays the received content information;

a key input unit of the mobile device which receives at least one input designating a content list from among content lists included in the received content information;

a download request unit of the mobile device which requests the IPTV to download and store content included in the content list from a service provider, the requested content including at least one of a broadcast video program and video on demand (VOD) contents; and a receiving unit of the mobile device which, in response to the request to the IPTV to download content, receives the downloaded and stored content from the IPTV based on a schedule, the stored content including the at least one of the broadcast video program and VOD contents, and wherein the schedule is pre-determined by a user input.

10. The content downloading apparatus of claim 9, further comprising:

a list storage unit which stores the content list, wherein the download request unit requests the IPTV to download content included in the stored content list.

11. A content downloading method of a mobile device, the method comprising:

if content information received from a service provider is updated, transmitting the content information from an Internet protocol television (IPTV) to the mobile device;

if the mobile device receives the content information from the IPTV, displaying, by the mobile device, the received content information;

receiving, at the mobile device, at least one content list, from among content lists included in the received content information, at a request from a user;

requesting, at the mobile device, the IPTV to download content included in the received content list from the service provider, the requested content including at least one of a broadcast video program and video on demand (VOD) contents;

if the IPTV receives a request to download the content, then in response to the request to download the content:

requesting, by the IPTV, the service provider to transmit the content;

receiving, at the IPTV, the content from the service provider;

storing the received content; and transmitting the stored content from the IPTV to the mobile device based on a schedule, the stored content including the at least one of the broadcast video program and VOD contents, wherein the schedule is pre-determined by a user input.

12. A content downloading system comprising:

an Internet protocol television (IPTV); and a mobile device, wherein if content information received, by the IPTV, from a service provider, is updated, then the received content information is transmitted, by the IPTV, to the mobile device, wherein if the IPTV receives a content download request from the mobile device, the requested content including at least one of a broadcast video program and video on demand (VOD) contents, then in response to the content download request:

a service provider is requested by the IPTV to transmit the content, the content is received by the IPTV, from the service provider, the received content is stored by the IPTV, and the stored content is transmitted by the IPTV to the mobile device based on a schedule, the stored content including the at least one of the broadcast video program and VOD contents;

wherein the schedule is pre-determined by a user input, and wherein, if the mobile device receives updated content information from the IPTV, then the mobile device:

displays the content information, receives at least one content list, from among content lists included in the content information, at a request from a user, and requests the IPTV to download content included in the content list.

* * * * *